United States Patent
Taki et al.

(10) Patent No.: US 8,909,455 B2
(45) Date of Patent: Dec. 9, 2014

(54) CONTROL DEVICE FOR INTERNAL COMBUSTION ENGINE

(71) Applicant: Suzuki Motor Corporation, Shizuoka-Ken (JP)

(72) Inventors: Isato Taki, Shizuoka-Ken (JP); Kenichi Osonoe, Shizuoka-Ken (JP); Yu Matsui, Shizuoka-Ken (JP); Toshihiko Atsumi, Shizuoka-Ken (JP)

(73) Assignee: Suzuki Motor Corporation, Hamamatsu-shi, Shizuoka-ken (JP)

( * ) Notice: Subject to any disclaimer, the term of this patent is extended or adjusted under 35 U.S.C. 154(b) by 71 days.

(21) Appl. No.: 13/904,133

(22) Filed: May 29, 2013

(65) Prior Publication Data
US 2013/0319356 A1    Dec. 5, 2013

(30) Foreign Application Priority Data

May 31, 2012   (JP) ................................. 2012-125137

(51) Int. Cl.
| | |
|---|---|
| B60T 7/12 | (2006.01) |
| F01L 1/34 | (2006.01) |
| F02P 5/15 | (2006.01) |
| F02D 41/30 | (2006.01) |
| F02D 13/02 | (2006.01) |
| F01L 1/26 | (2006.01) |
| F01L 13/00 | (2006.01) |
| F02D 41/10 | (2006.01) |
| F02D 41/00 | (2006.01) |

(52) U.S. Cl.
CPC ................. *F01L 1/34* (2013.01); *F02P 5/1504* (2013.01); *F02D 41/307* (2013.01); *F02D 13/0226* (2013.01); *F01L 1/267* (2013.01); *F01L 13/0042* (2013.01); *F02D 41/10* (2013.01); *F02D 2250/21* (2013.01); *Y02T 10/46* (2013.01); *F02D 2041/001* (2013.01); *F02D 2041/002* (2013.01); *F01L 2013/0078* (2013.01); *F01L 2105/00* (2013.01); *Y02T 10/18* (2013.01)
USPC ......................... 701/103; 123/321; 123/90.15

(58) Field of Classification Search
CPC ........................ F02D 41/0002; F02D 2041/001
USPC .......... 701/103–105; 123/321, 322, 345–348, 123/90.15–90.17
See application file for complete search history.

(56) References Cited

U.S. PATENT DOCUMENTS

| | | | | |
|---|---|---|---|---|
| 6,600,989 | B2 * | 7/2003 | Sellnau et al. | 701/110 |
| 6,615,129 | B2 * | 9/2003 | Kabasin | 701/110 |
| 7,597,072 | B2 * | 10/2009 | Stein et al. | 123/90.15 |
| 8,061,318 | B2 * | 11/2011 | Cleary et al. | 123/90.17 |

FOREIGN PATENT DOCUMENTS

JP            2004100547 A       4/2004

* cited by examiner

*Primary Examiner* — John Kwon
(74) *Attorney, Agent, or Firm* — Barnes & Thornburg LLP (57) ABSTRACT

A control device for an internal combustion engine including a camshaft of the internal combustion engine; a plurality of plane cam shape portions; at least one transitional shape portion; a cam switching mechanism; a cam position sensor; and a control section. The plane cam shape portions, at the camshaft, have valve lift characteristics different from each other, have respective cam faces parallel to a rotation axis of the camshaft, and are spaced apart from each other. The transitional shape portion is between two adjacent ones of the plane cam shape portions and has a curved cam face which connects the cam faces of the two plane cam shape portions. The cam switching mechanism switches between the valve lift characteristics for an intake valve by selecting one of the plane cam shape portions via the transitional shape portion.

8 Claims, 7 Drawing Sheets

CONTROL DEVICE FOR INTERNAL COMBUSTION ENGINE

PRIORITY CLAIM

This patent application claims priority to Japanese Patent Application No. 2012-125137, filed 31 May 2012, the disclosure of which is incorporated herein by reference in its entirety.

BACKGROUND OF THE INVENTION

1. Field of the Invention

The present invention relates to a control device for an internal combustion engine.

2. Description of the Related Art

As intake-side valve train mechanism of an internal combustion engine, so-called cam switching type valve train mechanism (or valve gear), includes a plurality of cams with different valve lift characteristics and acts to switch the cams by selecting one of the cams and drives an intake valve.

In an operation, the cam switching type valve train mechanism needs to switch ignition timing simultaneously with switching from one cam to another.

For this reason, there is known a control device for an internal combustion engine which controls ignition timing so as to have an intermediate value as a point of compromise without giving significant effect on operability of any cam during a cam switching period (see, e.g., Patent Document 1: Japanese Patent Laid-Open No. 2004-100547).

There is also known a so-called "three-dimensional cam" having a cross-sectional shape which changes continuously in a rotation axis direction. The three-dimensional cam includes a plurality of plane cam shape portions and a transitional shape portion. The plural cam shape portions have valve lift characteristics respectively different from each other and have respective cam faces parallel to a rotation axis of a camshaft. The transitional shape portion is located between the adjacent plane cam shape portions and has a curved cam face which connects the cam faces of the adjacent plane cam shape portions so as to be continuous with the cam faces. Herein, it is further to be noted that the term "plane cam shape" means a cam shape, which actually has a cubic (curved-) shape parallel to a camshaft, and in a sectional shape along the cam shaft, is parallel to the cam shaft compared with "transitional shape" which is oblique to the cam shaft.

As like as cams of a conventional valve train mechanism, in the three-dimensional cam, torque curves of one plane cam shape portion and another plane cam shape portion under a same intake negative pressure do not cross each other. That is, the plane cam shape portions have widely different cam profiles.

The wide differences among the plane cam shape portions cause a significant change in engine power at the time of switching between plane cam shape portions, which may give discomfort feeling in operation of a vehicle.

SUMMARY OF THE INVENTION

The present invention was conceived in consideration of the circumstances described above, and an object thereof is to provide a control device for an internal combustion engine capable of smoothly and continuously changing engine power at the time of switching a valve lift characteristic for an intake valve of the internal combustion engine.

The above and other objects can be achieved, in a preferred aspect, by providing a control device for an internal combustion engine, which Includes: a camshaft of the internal combustion engine; a plurality of plane cam shape portions, which are provided to the camshaft, respectively have valve lift characteristics different from each other, respectively have cam faces parallel to a rotation axis of the camshaft, and are spaced apart from each other; at least one transitional shape portion, which is provided between adjacent plane cam shape portions so as to be integral with the two plane cam shape portions and has a curved cam face connecting the cam faces of the adjacent plane cam shape portions so as to be continuous with the cam faces; a cam switching mechanism, which is configured to switch a cam between the valve lift characteristics for an intake valve by selecting one of the plurality of plane cam shape portions via the transitional shape portion; a cam position sensor, which is configured to sense which position of the cam faces and the curved cam face in a rotation axis direction of the camshaft drives the intake valve; and a control unit, which is configured to make a plane cam portion controlled variable for the internal combustion engine in a case where the cam face drives the intake valve and a transitional portion controlled variable for the internal combustion engine in a case where the curved cam face drives the intake valve different from each other on the basis of a sensing result from the cam position sensor.

According to control device for an internal combustion engine of the present invention, the engine power at the time of switching a valve lift characteristic for an intake valve can be smoothly and continuously changed.

The nature and further characteristic features of the present invention will be made clearer from the following descriptions made with reference to the accompanying drawings.

BRIEF DESCRIPTION OF THE DRAWINGS

In the accompanying drawings.

DESCRIPTION OF THE PREFERRED EMBODIMENT

An embodiment of a control device for an internal combustion engine according to the present invention will be described below with reference to FIGS. 1 to 7.

Figure 1:
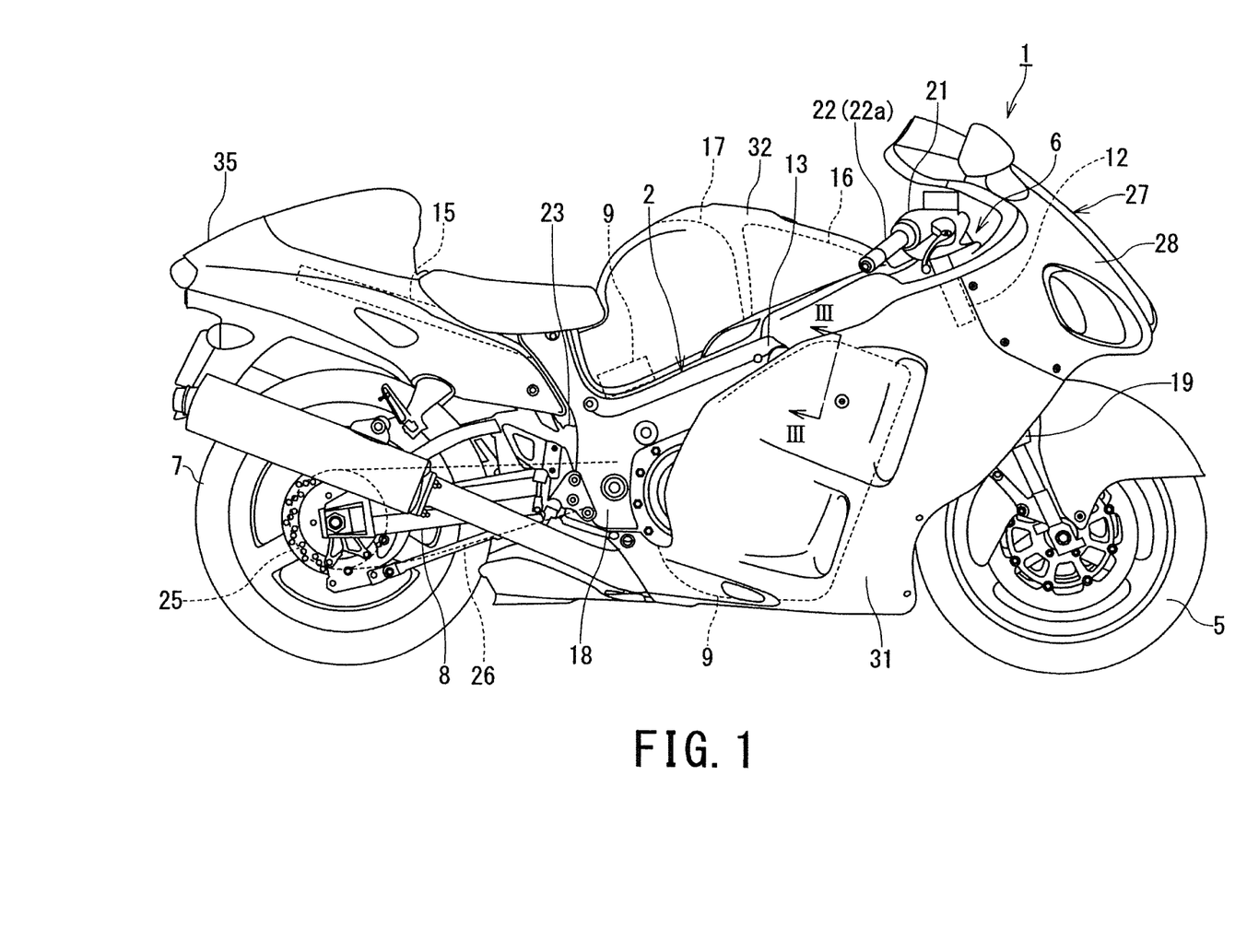
FIG. 1 is a right side view showing a motorcycle equipped with a control device for an internal combustion engine according to an embodiment of the present invention.

With reference to FIG. 1 showing a motorcycle equipped with a control device for an internal combustion engine according to an embodiment of the present invention, it is first to be noted that a side indicated by a solid arrow F in FIG. 1 and a side indicated by a solid arrow R in FIG. 1 are defined as a front side and a rear side, respectively, a left-hand side of a rider of the motorcycle 1 and an opposite side of the rider are defined as a left side of the motorcycle 1 and a right side of the motorcycle 1, respectively, and additionally, a head side of a rider of the motorcycle 1 and an opposite side of the rider are defined as an upper side of the motorcycle 1 and a lower side of the motorcycle 1, respectively. Furthermore, the directions in each of components of the motorcycle 1 substantially correspond to those in the motorcycle 1.

As shown in FIG. 1, the motorcycle 1 includes a vehicle body frame 2 which extends in a longitudinal direction of the vehicle, a front wheel 5 which is located at a front portion of the vehicle body frame 2, a steering mechanism 6 which is located at the front portion of the vehicle body frame 2 and supports the front wheel 5 to be rotatable, a rear wheel 7 which is located at a rear portion of the vehicle body frame 2, and a swing arm 8 which extends rearward from the vehicle body frame 2 and supports the rear wheel 7 to be rotatable.

The motorcycle 1 also includes an engine 9 as an internal combustion engine which is located at a lower central portion of a vehicle body, and an engine control module 11 which controls operation of the engine 9.

The vehicle body frame 2 is a so-called cradle type one. The vehicle body frame 2 includes a steering head pipe 12 which lies at an upper portion of a front end, a pair of left and right main frames 13 which branch off to left and right just behind the steering head pipe 12 and extend rearward, and a pair of left and right seat rails 15 connected to respective rear ends of the left and right main frames 13 so as to extend rearward and gently upward.

The steering head pipe 12 is a rotation center of the steering mechanism 6 that is supported on the vehicle body frame 2.

The left and right main frames 13 branch off to left and right just behind the steering head pipe 12 and are spread by an extent to be equal in width of the engine 9. Each of the main frames 13 includes a long straight portion which extends rearward and gently downward and a short straight portion which is connected to the straight portion and extends downward.

The left and right main frames 13 support the engine 9 that is arranged below the long straight portions and in front of the short straight portions of the main frames so as to hold the engine 9. The left and right main frames 13 support an air cleaner box 16 arranged on front half portions of the long straight portions so as to support a fuel tank 17 which lies on rear half portions of the long straight portions and also support a pivot shaft 18 which extends in a vehicle width direction between the short straight portions. The pivot shaft 18 is a swing center which supports the swing arm 8.

The engine 9 is arranged behind the front wheel 5 and below the main frames 13 and occupies a lower central portion of the motorcycle 1. The engine 9 is, for example, a 4-stroke-cycle in-line 4-cylinder engine.

The steering mechanism 6 includes a steering shaft, not shown, which extends through the steering head pipe 12 as the rotation center of the steering mechanism 6, a pair of left and right front forks 19 which extend vertically, and a pair of left and right handle bars 21 which are fixed in a vicinity of corresponding upper ends of the front forks 19 and extend outward in a lateral direction (left and right direction).

Each of the handle bars 21 includes a handle grip 22 to be gripped by a rider. The right-hand handle grip 22 is a throttle grip 22a.

The swing arm 8 supports the rear wheel 7 to be vertically swingable, and a rear cushion unit 23 intervenes between the swing arm 8 and the vehicle body frame 2 to mitigate a force transmitted from the rear wheel 7 to the vehicle body frame 2.

The rear wheel 7 includes a driven sprocket 25 around which a drive chain 26 is entrained to thereby transmit a driving force from the engine 9 to the rear wheel 7.

The motorcycle 1 also includes a streamlined cowling 27 which covers at least a portion (e.g., from a front portion to the lower central portion) of the vehicle. The cowling 27 reduces air resistance of the motorcycle 1 during the travelling of the vehicle and protects a rider from travel wind pressure. The cowling 27 includes a front cover 28 which covers a front portion of the vehicle, a pair of left and right side covers 31 which cover side portions of the engine 9, an air cleaner cover 32 which covers the air cleaner box 16 and fuel tank 17, and a rear cover 35 which supports a seat 33 and covers a rear portion of the vehicle.

Figure 2:
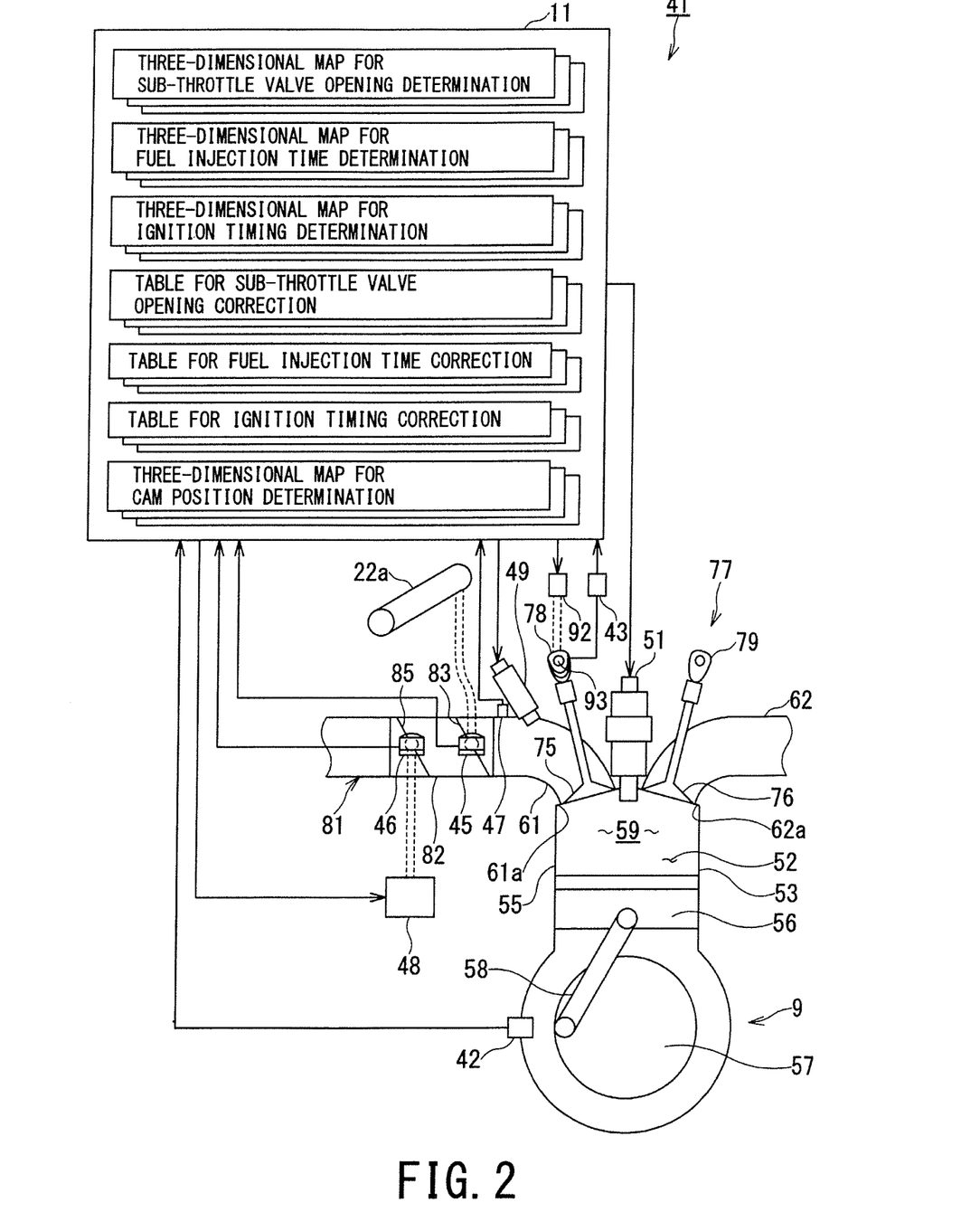
FIG. 2 is a block diagram showing the control device for the internal combustion engine according to the embodiment of the present invention.

FIG. 2 is a block diagram showing the control device for the internal combustion engine according to the embodiment of the present invention.

As shown in FIG. 2, a control device 41 according to the present embodiment processes sensing results from an engine speed sensor (sensor for detecting engine revolution number) 42, a cam position sensor 43, a throttle position sensor 45, a sub-throttle position sensor 46, and a manifold pressure sensor 47 by means of the engine control module 11 and then controls, according to the sensing results, a sub-throttle valve drive motor 48, a fuel injection device 49, and an ignition system 51, and also controls the operation of the engine 9.

The engine 9 includes; a cylinder block 53 having a cylinder bore 52; a cylinder head 55 which is fixed to the cylinder block 53; a piston 56 which is housed in the cylinder bore 52 so as to be reciprocal; a crankshaft 57 which is housed in the cylinder block 53 and supported to be rotatable; a connecting rod 58 which couples the piston 56 and crankshaft 57 so as to convert the reciprocal motion of the piston 56 into rotational motion of the crankshaft 57; an intake pipe 61 and an exhaust pipe 62 which are connected to a combustion chamber 59 defined by the piston 56, a cylinder block 53, and cylinder head 55; an intake valve 75 which is provided on the cylinder head 55 so as to open and/or close an intake port 61a of the intake pipe 61; an exhaust valve 76 which is provided on the cylinder head 55 so as to open and/or close an exhaust port 62a of the exhaust pipe 62; a valve train mechanism 77 which drives the intake valve 75 and exhaust valve 76; and the ignition system 51 that penetrates into the cylinder head 55 toward the combustion chamber 59.

The valve train mechanism 77 is a so-called variable valve train mechanism of a double overhead camshaft (DOHC) type. The valve train mechanism 77 appropriately controls an intake air amount by continuously changing a valve lift amount of the intake valve 75 to achieve increase in power of the engine 9, enhancement in fuel economy and cleaning of exhaust gas.

The valve train mechanism 77 includes an intake-side cam 78 which drives the intake valve 75, a cam switching mechanism 92, and an exhaust-side cam 79 which drives the exhaust valve 76.

The intake-side cam 78 is a so-called "three-dimensional cam" which has a cross-sectional shape (i.e., a cam profile) changing continuously in a rotation axis direction and slides in a rotation axis direction of an intake-side camshaft 93 to continuously change a valve lift characteristic for the intake valve 75.

The exhaust-side cam 79 may be one which can continuously change a valve lift amount of the exhaust valve 76 or one which keeps the valve lift amount constant, i.e., has a constant cam profile.

The intake pipe 61 is connected to an engine intake unit 81. The engine intake unit 81 includes a throttle body 82 having an intake passage, a throttle valve 83 and a sub-throttle valve 85 which are provided at the throttle body 82 to change a cross-sectional area of the intake passage, and the fuel injection device 49 disposed between the throttle valve 83 and the intake valve 75.

The throttle valve 83 is connected to a throttle cable 86 which transmits an operation amount of the throttle grip 22a and is opened or closed in correlation to the operation amount of the throttle grip 22a.

The sub-throttle valve 85 changes the intake amount in cooperation with the throttle valve 83.

The control device 41 includes; the engine speed sensor 42 that detects an rpm of the crankshaft 57, i.e., a rotation speed of the engine 9 (e.g., engine revolution number per minute); the cam position sensor 43 that detects which position of the intake-side cam 78 is driving the intake valve 75; the throttle position sensor 45 that detects degree of opening of the throttle valve 83; the sub-throttle position sensor 46 that detects degree of opening of the sub-throttle valve 85; and the manifold pressure sensor 47 that detects a pressure of air sucked into the engine 9.

The control device 41 also includes the sub-throttle valve drive motor 48 so as to open or close the sub-throttle valve 85, the fuel injection device 49 that injects fuel into intake air in the intake pipe 61 so as to produce an air-fuel mixture, and the ignition system 51 that ignites an air-fuel mixture in the combustion chamber 59.

The control device 41 further includes the engine control module 11 as a control unit which determines controlled amounts for the sub-throttle valve drive motor 48, the fuel injection device 49, and the ignition system 51 on the basis of respective detected (sensed) results from the engine speed sensor 42, the cam position sensor 43, the throttle position sensor 45, the sub-throttle position sensor 46, and the manifold pressure sensor 47 for controlling the operation of the engine 9.

More specifically, the engine control module 11 controls a duty ratio as a controlled variable of the sub-throttle valve drive motor 48, a fuel injection time as a controlled variable of the fuel injection device 49, and ignition timing as a controlled variable of the ignition system 51, on the basis of a sensing signal indicating the speed of the engine 9 output by the engine speed sensor 42, a sensing signal indicating the opening of the throttle valve 83 output by the throttle position sensor 45, a sensing signal indicating the opening of the sub-throttle valve 85 output by the sub-throttle position sensor 46, a sensing signal indicating the manifold pressure of the engine 9 output by the manifold pressure sensor 47, and a sensing signal indicating the position of the intake-side cam 78 output by the cam position sensor 43.

The engine control module 11 stores: a three-dimensional map for sub-throttle valve opening determination for determining the duty ratio as the controlled variable of the sub-throttle valve drive motor 48 from combination of the opening of the throttle valve 83 and the rotation speed of the engine 9 and combination of the manifold pressure of the engine 9 and the rotation speed of the engine 9; a three-dimensional map for fuel injection time determination for determining the fuel injection time of the fuel injection device 49 from the combination of the opening of the throttle valve 83 and the rotation speed of the engine 9 and the combination of the manifold pressure of the engine 9 and the rotation speed of the engine 9; and a three-dimensional map for ignition timing determination for determining the ignition timing of the ignition system 51 from the combination of the opening of the throttle valve 83 and the rotation speed of the engine 9 and the combination of the manifold pressure of the engine 9 and the rotation speed of the engine 9.

Each of the three-dimensional map for sub-throttle valve opening determination, the three-dimensional map for fuel injection time determination, and the three-dimensional map for ignition timing determination has enhanced controllability by combining a three-dimensional map for determining the controlled variable from a relationship between the opening of the throttle valve 83 and the rotation speed of the engine 9 and a three-dimensional map for determining the controlled variable from a relationship between the manifold pressure of the engine 9 and the rotation speed of the engine 9. More specifically, each of the three-dimensional map for fuel injection time determination and the three-dimensional map for ignition timing determination provides a value for the controlled variable which is determined by reducing a weight of the three-dimensional map related to the opening of the throttle valve 83 and increasing a weight of the three-dimensional map related to the manifold pressure of the engine 9 when the opening of the throttle valve 83 is small, and also provides a value for the controlled variable which is determined by increasing the weight of the three-dimensional map related to the opening of the throttle valve 83 and reducing the weight of the three-dimensional map related to the manifold pressure of the engine 9 when the opening of the throttle valve 83 is large.

The engine control module 11 also stores a table for sub-throttle valve opening correction for determining a correction factor for the three-dimensional map for sub-throttle valve opening determination from the position of the intake-side cam 78, a table for fuel injection time correction for determining a correction factor for the three-dimensional map for fuel injection time determination from the position of the intake-side cam 78, and a table for ignition timing correction for determining a correction factor for the three-dimensional map for ignition timing determination from the position of the intake-side cam 78.

The engine control module 11 further stores a three-dimensional map for cam position determination for determining the position of the intake-side cam 78 from the combination of the opening of the throttle valve 83 and the rotation speed of the engine 9 and the combination of the manifold pressure of the engine 9 and the rotation speed of the engine 9. Furthermore, the engine control module 11 drives the cam switching mechanism 92 on the basis of the three-dimensional map for cam position determination to switch the position of the intake-side cam 78.

Hereinafter, the valve train mechanism 77 will be described in detail.

Figure 3:
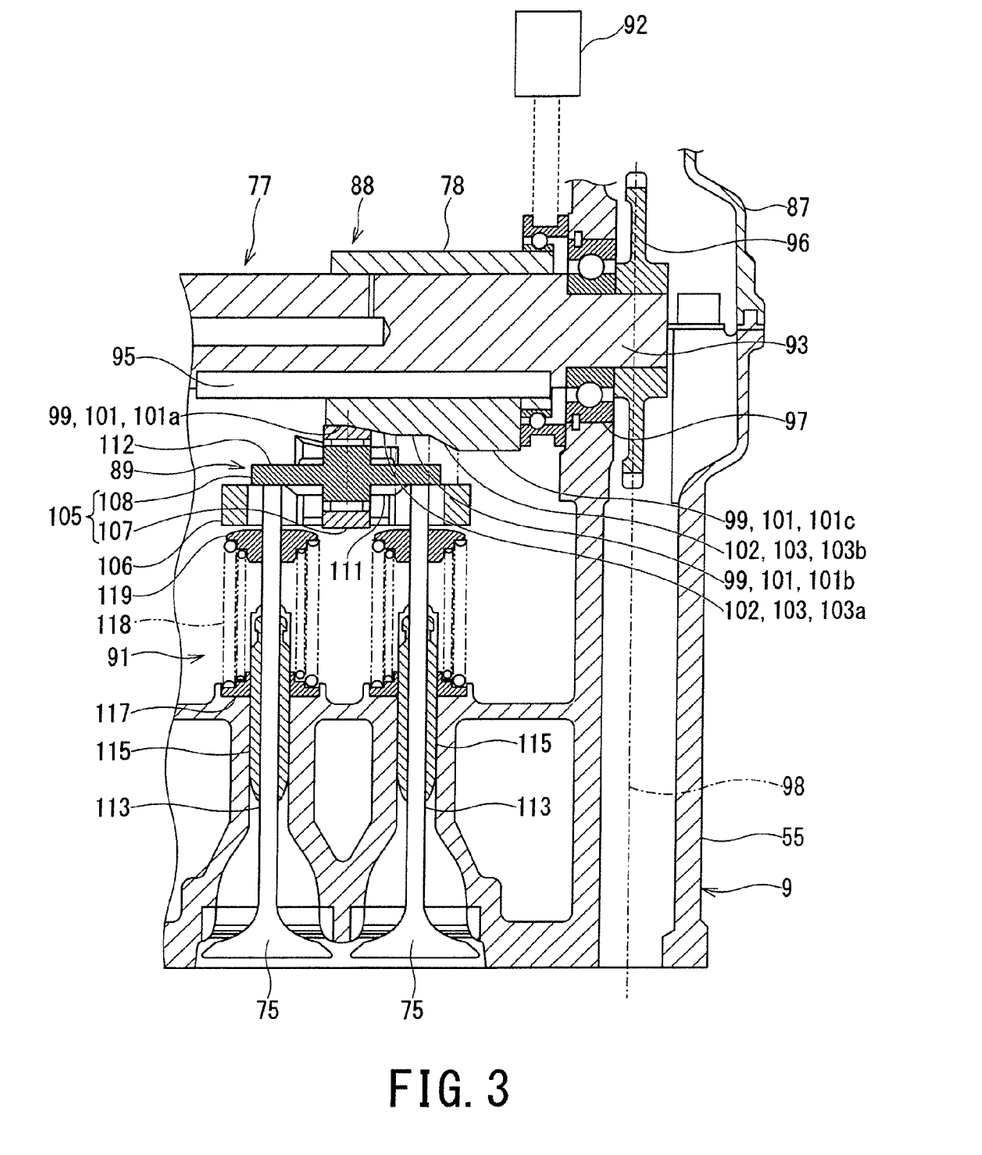
FIG. 3 is a cross-sectional view schematically illustrating a valve train mechanism of the internal combustion engine according to the present embodiment.

FIG. 3 is a cross-sectional view taken along the line in FIG. 1 and schematically shows the valve train mechanism of the internal combustion engine according to the present embodiment.

Although FIG. 3 shows the intake-side cam 78 of the valve train mechanism 77, the exhaust-side cam 79 may be a three-dimensional cam having the same structure as the intake-side cam 78 or a general cam having one cam profile.

As shown in FIG. 3, the valve train mechanism 77 of the engine 9 according to the present embodiment is housed in the cylinder head 55 and a head cover 87 of the engine 9. The valve train mechanism 77 includes an intake-side cam-and-camshaft unit 88, an intake-side valve lifter unit 89, an intake valve unit 91 which supports the intake valve 75, and the cam switching mechanism 92.

The intake-side cam-camshaft unit 88 includes the intake-side camshaft 93, a key 95, an intake-side driven sprocket 96, and the intake-side cam 78.

The intake-side camshaft 93 is rotatably supported by a bearing 97 which is mounted to the cylinder head 55.

The key 95 supports the intake-side cam 78 to be rotatable integrally with the intake-side camshaft 93 and is movable (slidable) in the rotation axis direction of the intake-side camshaft 93. The key 95 may be a spline, not shown.

The intake-side driven sprocket 96 is arranged at one end of the intake-side camshaft 93 so as to rotate integrally with the intake-side camshaft 93. A cam chain 98 is entrained about the intake-side driven sprocket 96 together with an exhaust-side driven sprocket (not shown) and a cam drive sprocket (not shown) which is provided so as to rotate integrally with the crankshaft (not shown). The cam chain 98 transmits rotation of the crankshaft to the intake-side driven sprocket 96 and exhaust-side driven sprocket to rotationally drive the intake-side camshaft 93 and an exhaust-side camshaft.

The intake-side cam 78 is mounted on the intake-side camshaft 93, and is provided with a plurality of plane cam shape portions 101 which have valve lift characteristics different from each other, have respective cam faces 99 parallel to a rotation axis of the intake-side camshaft 93, and are spaced apart from each other, and also provided with at least one transitional shape portion 103 which is provided between two adjacent plane cam shape portions 101 so as to be integral with the two plane cam shape portions 101 and has a curved cam face 102 which connects the cam faces 99 of the two plane cam shape portions 101 so as to be continuous with the cam faces 99.

Further, although it is already described hereinbefore, it is to be noted that the term "plane cam shape" means a cam shape parallel to a camshaft, and in a sectional shape along the cam shaft, it is parallel to the cam shaft compared with "transitional shape" which is oblique to the cam shaft.

More specifically, the intake-side cam 78 includes three plane cam shape portions 101 and two transitional shape portions 103 that are alternately arranged.

Each plane cam shape portion 101 has a cam profile which is kept constant over a fixed zone in the rotation axis direction of the intake-side cam 78 (and the intake-side camshaft 93). The respective plane cam shape portions 101 have cam profiles different from each other and are placed in order of valve lift characteristic from smallest to largest. The plane cam shape portion 101 with a smallest valve lift characteristic is referred to as a low plane cam shape portion 101a, the plane cam shape portion 101 with a medium valve lift characteristic is referred to as a medium plane cam shape portion 101b, and the plane cam shape portion 101 with a largest valve lift characteristic is referred to as a high plane cam shape portion 101c.

The transitional shape portion 103 has a cam profile which changes continuously and steplessly over a fixed zone in the rotation axis direction of the intake-side cam 78 (and the intake-side camshaft 93). The transitional shape portion 103 that connects the low plane cam shape portion 101a and medium plane cam shape portion 101b is referred to as a first transitional shape portion 103a, and the transitional shape portion 103 that connects the medium plane cam shape portion 101b and high plane cam shape portion 101c is referred to as a second transitional shape portion 103b.

The intake-side valve lifter unit 89 is in contact with the intake-side cam and camshaft unit 88 and follows the cam profile of the intake-side cam 78 to drive to open or close the intake valve 75. The intake-side valve lifter unit 89 includes a valve lifter 105 which causes the intake valve 75 to follow the cam profile of the intake-side cam 78 and a valve lifter holder 106 which holds the intake valve 75 and valve lifter 105. The valve lifter 105 includes a roller section 107 which is in contact with the intake-side cam 78 and a core 108 which supports the roller section 107 such that the roller section 107 is rotatable.

The core 108 includes a base 111 which supports the roller section 107 such that the roller section 107 is rotatable and arm sections 112 which extend from both sides of the base 111. Each arm section 112 is in contact with a stem top face of the intake valve 75. The valve lifter 105 simultaneously drives to open or close two intake valves 75 by one roller section 107.

The valve lifter holder 106 holds the valve lifter 105 in a floating manner so that the intake valves 75 are movable only in an opening and closing direction.

The intake valve unit 91 includes a valve guide 115 which supports the valve stem 113 of each intake valve 75 on the cylinder head 55, a valve retainer 116 which is provided at an end of the valve stem 113, a spring seat 117 which is provided at the cylinder head 55, and valve springs 118 which extend between the valve retainer 116 and the corresponding spring seat 117.

The cam switching mechanism 92 switches the valve lift characteristic for the intake valves 75 by selecting any one of the plurality of plane cam shape portions 101 via the transitional shape portions 103. The cam switching mechanism 92 includes a ball screw nut, not shown, which is coupled to the intake-side cam 78 and a motor, not shown, which drives the ball screw nut.

The cam switching mechanism 92 moves the intake-side cam 78 by driving the motor and advancing or retracting the ball screw nut.

The cam position sensor 43 senses (i.e., detects) movement of the ball screw nut of the cam switching mechanism 92 or the intake-side cam 78 itself and outputs a sensing result to the engine control module 11. That is, the position of the intake-side cam 78 which is output by the cam position sensor 43 is associated with the valve lift characteristic of the intake-side cam 78 for the intake valves 75.

Incidentally, three-dimensional maps stored in the engine control module 11 include ones which are individually associated with each of corresponding plane cam shape portions 101 (the low plane cam shape portion 101a, the medium plane cam shape portion 101b, or the high plane cam shape portion 101c).

That is, the engine control module 11 stores a three-dimensional map for sub-throttle valve opening determination, a three-dimensional map for fuel injection time determination, and a three-dimensional map for ignition timing determination which are associated with the low plane cam shape portion 101a, a three-dimensional map for sub-throttle valve opening determination, a three-dimensional map for fuel injection time determination, and a three-dimensional map for ignition timing determination which are associated with the medium plane cam shape portion 101b, and a three-dimensional map for sub-throttle valve opening determination, a three-dimensional map for fuel injection time determination, and a three-dimensional map for ignition timing determination which are associated with the high plane cam shape portion 101c.

Tables for correction stored in the engine control module 11 include ones which are individually associated with the respective portions of the transitional shape portion 103 (the first transitional shape portion 103a or the second transitional shape portion 103b). That is, the engine control module 11 stores a table for sub-throttle valve opening correction, a table for fuel injection time correction, and a table for ignition timing correction which are associated with the first transitional shape portion 103a and a table for sub-throttle valve opening correction, a table for fuel injection time correction, and a table for ignition timing correction which are associated with the second transitional shape portion 103b.

Figure 4:
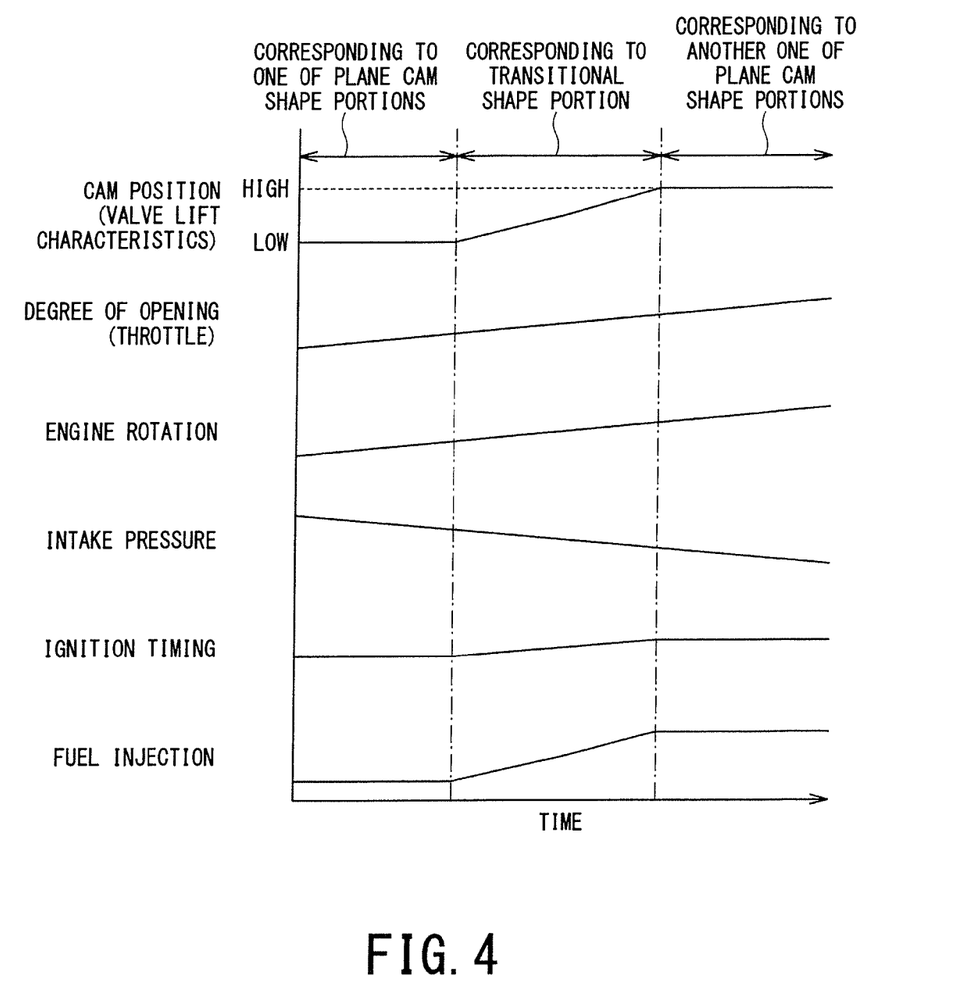
FIG. 4 is a timing chart representing control for determining amount to be controlled (which may be called hereinafter as "controlled variable) by the control device for the internal combustion engine according to the present embodiment.

FIG. 4 is a timing chart showing controlled variable determination control of the control device for the internal combustion engine according to the embodiment of the present invention.

As shown in FIG. 4, the engine control module 11 of the control device 41 according to the present embodiment changes the valve lift characteristic for the intake valves 75 by moving the intake-side cam 78 in relation to the relationship between the opening of the throttle valve 83 that is opened in proportion to a twist amount of the throttle grip 22a and the speed of the engine 9 or the relationship between the manifold pressure of the engine 9 and the speed of the engine 9.

More specifically, the engine control module 11 moves the intake-side cam 78 to change the valve lift characteristic for the intake valves 75 from a smaller valve lift characteristic of the plane cam shape portion 101 on one side (a lower plane cam shape portion) to a larger valve lift characteristic of the plane cam shape portion 101 on another side (a higher plane cam shape portion). At this time, the intake-side cam 78 drives the intake valves 75 at the transitional shape portion 103 sandwiched between the two plane cam shape portions 101 during the time of switching from the plane cam shape portion 101 on the one side to the plane cam shape portion 101 on the another side.

That is, during the time period of operation in which the opening of the throttle valve 83 is relatively small, and the speed of the engine 9 is relatively low (the manifold pressure of the engine 9 is relative high), the engine control module 11 drives the intake valves 75 at the plane cam shape portion 101 with the smaller valve lift characteristic on the one side. At this time, the engine control module 11 determines the duty ratio as the controlled variable of the sub-throttle valve drive motor 48, determines the fuel injection time of the fuel injection device 49, and determines the ignition timing of the ignition system 51, on the basis of the three-dimensional map for sub-throttle valve opening determination, the three-dimensional map for fuel injection time determination, and the three-dimensional map for ignition timing determination associated with the plane cam shape portion 101 concerned.

On the other hand, during the time period of operation in which the opening of the throttle valve 83 is relatively large, and the speed of the engine 9 is relatively high (the manifold pressure of the engine 9 is relative low), the engine control module 11 drives the intake valves 75 at the plane cam shape portion 101 with the larger valve lift characteristic on the another side. At this time, the engine control module 11 determines the duty ratio as the controlled variable of the sub-throttle valve drive motor 48, determines the fuel injection time of the fuel injection device 49, and determines the ignition timing of the ignition system 51, on the basis of the three-dimensional map for sub-throttle valve opening determination, the three-dimensional map for fuel injection time determination, and the three-dimensional map for ignition timing determination associated with the plane cam shape portion 101 concerned.

In addition, during the time in operation in which changes in the opening of the throttle valve 83, the speed of the engine 9, and the manifold pressure of the engine 9 progress, respectively, the engine control module 11 drives the intake valves 75 at the transitional shape portion 103 sandwiched between the two plane cam shape portions 101.

At this time, the engine control module 11 refers to the respective three-dimensional maps for sub-throttle valve opening determination, the respective three-dimensional maps for fuel injection time determination, and the respective three-dimensional maps for ignition timing determination associated with the two plane cam shape portions 101. The engine control module 11 determines the duty ratio as the controlled variable of the sub-throttle valve drive motor 48, determines the fuel injection time of the fuel injection device 49, and determines the ignition timing of the ignition system 51 by correcting reference values from the three-dimensional maps.

Figure 5:
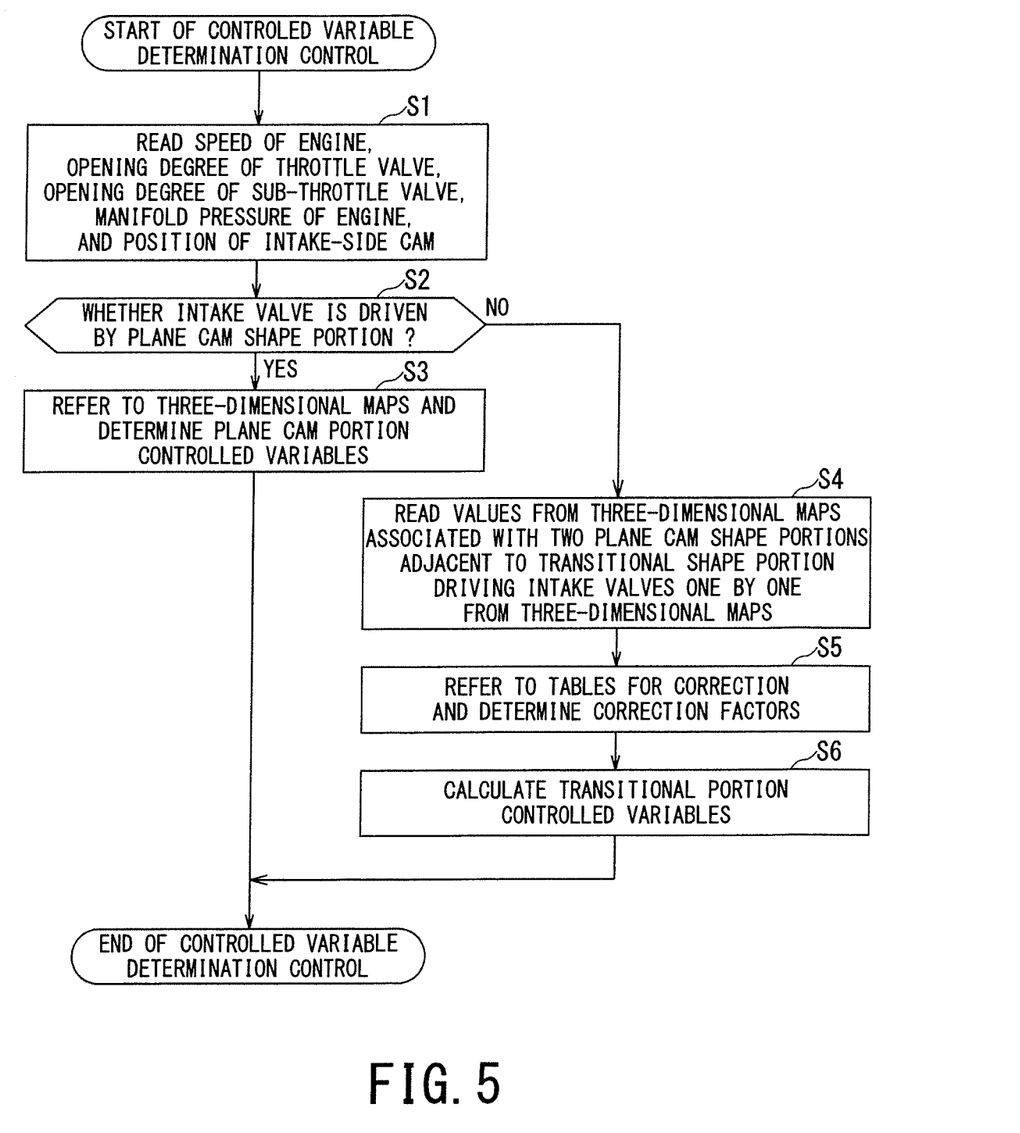
FIG. 5 is a flow chart explaining the control for determining controlled variable by the control device for the internal combustion engine according to the present embodiment.

FIG. 5 is a flow chart showing the controlled variable determination control process of the control device for the internal combustion engine according to the embodiment of the present invention.

As shown in FIG. 5, according to the engine control module 11 of the control device 41 according to the present embodiment, the plane cam portion controlled variables for the engine 9 in a case where the cam face 99 drives the intake valves 75 and the transitional portion controlled variables for the engine 9 in a case where the curved cam face 102 drives the intake valves 75 are made different from each other, on the basis of a sensing (i.e., detecting) result from the cam position sensor 43.

The engine control module 11 also corrects the transitional portion controlled variables according to a position in the rotation axis direction of the intake-side camshaft 93 at the curved cam face 102 with each passing moment.

Further, herein, the plane cam portion controlled variables are a controlled variable which is obtained from the three-dimensional map for sub-throttle valve opening determination associated with the cam face 99 driving the intake valves 75, a controlled variable which is obtained from the three-dimensional map for fuel injection time determination associated with the cam face 99 driving the intake valves 75, and a controlled variable which is obtained from the three-dimensional map for ignition timing determination associated with the cam face 99 driving the intake valves 75.

The transitional portion controlled variables are based on the position of the intake-side cam 78 and are a controlled variable which is obtained by correcting values from the three-dimensional maps for sub-throttle valve opening determination with the table for sub-throttle valve opening correction, a controlled variable which is obtained by correcting values from the three-dimensional maps for fuel injection time determination with the table for fuel injection time correction, and a controlled variable which is obtained by correcting values from the three-dimensional maps for ignition timing determination with the table for ignition timing correction.

Each of the table for sub-throttle valve opening correction, the table for fuel injection time correction, and the table for ignition timing correction has a correction factor which is set in advance for each of the positions of the curved cam face 102 driving the intake valves 75 in the rotation axis direction of the intake-side camshaft 93.

That is, when the cam face 99 drives the intake valves 75, the engine control module 11 determines the plane cam portion controlled variables from the three-dimensional map for sub-throttle valve opening determination, the three-dimensional map for fuel injection time determination, and the three-dimensional map for ignition timing determination associated with the cam face 99 concerned.

On the other hand, when the curved cam face 102 drives the intake valves 75, the engine control module 11 determines the transitional portion controlled variables as a controlled variable which is obtained by correcting values from the three-dimensional maps for sub-throttle valve opening determination with the table for sub-throttle valve opening correction on the basis of the position of the intake-side cam 78, a controlled variable which is obtained by correcting values from the three-dimensional maps for fuel injection time determination with the table for fuel injection time correction on the basis of the position of the intake-side cam 78, and a controlled variable which is obtained by correcting values from the three-dimensional maps for ignition timing determination with the table for ignition timing correction on the basis of the position of the intake-side cam 78.

More specifically, the engine control module 11 first reads a sensing signal indicating the speed of the engine 9 which is output by the engine speed sensor 42, a sensing signal indicating the opening of the throttle valve 83 which is output by the throttle position sensor 45, a sensing signal indicating the opening of the sub-throttle valve 85 which is output by the sub-throttle position sensor 46, a sensing signal indicating the manifold pressure of the engine 9 which is output by the manifold pressure sensor 47, and a sensing signal indicating the position of the intake-side cam 78 which is output by the cam position sensor 43 (step S1).

Then, the engine control module 11 determines from the sensing signal indicating the position of the intake-side cam 78 which is output by the cam position sensor 43 whether or not the intake valves 75 are driven by the plane cam shape portion 101. If the intake valves 75 are driven by the plane cam shape portion 101, the operation in the operation (or flow) in the engine control module 11 advances to the next step. Otherwise (i.e., if the intake valves 75 are driven by the transitional shape portion 103), the operation in the engine control module 11 advances to step S4 (step S2).

Next, the engine control module 11 refers to the three-dimensional map for sub-throttle valve opening determination, the three-dimensional map for fuel injection time determination, and the three-dimensional map for ignition timing determination associated with the plane cam shape portion 101, from the sensing signal indicating the speed of the engine 9 which is output by the engine speed sensor 42, the sensing signal indicating the opening of the throttle valve 83 which is output by the throttle position sensor 45, the sensing signal indicating the opening of the sub-throttle valve 85 which is output by the sub-throttle position sensor 46, and the sensing signal indicating the manifold pressure of the engine 9 which is output by the manifold pressure sensor 47, determines the plane cam portion controlled variables (i.e., determines the duty ratio as the controlled variable of the sub-throttle valve drive motor 48, determines the fuel injection time of the fuel injection device 49, and determines the ignition timing of the ignition system 51) (step S3), and then, the controlled variable determination control is ended. Herein, it is further noted that the engine control module 11 refers to the three-dimensional maps that are associated with any one of the plane cam shape portions 101 that is driving the intake valves 75, i.e., the low plane cam shape portion 101a, the medium plane cam shape portion 101b, or the high plane cam shape portion 101c.

On the other hand, if the intake valves 75 are driven by the transitional shape portion 103, the engine control module 11 refers to the respective three-dimensional maps for sub-throttle valve opening determination, the respective three-dimensional maps for fuel injection time determination, and the respective three-dimensional maps for ignition timing determination that are associated with the two plane cam shape portions 101 adjacent to the transitional shape portion 103 concerned by using the sensing signal indicating the speed of the engine 9 which is output by the engine speed sensor 42, the sensing signal indicating the opening of the throttle valve 83 which is output by the throttle position sensor 45, the sensing signal indicating the opening of the sub-throttle valve 85 which is output by the sub-throttle position sensor 46, and the sensing signal indicating the manifold pressure of the engine 9 which is output by the manifold pressure sensor 47.

The engine control module 11 reads values for the duty ratio as the controlled variable of the sub-throttle valve drive motor 48 from the three-dimensional maps for sub-throttle valve opening determination one by one from each three-dimensional map, reads values for the fuel injection time of the fuel injection device 49 from the three-dimensional maps for fuel injection time determination one by one from each three-dimensional map, and reads values for the ignition timing of the ignition system 51 from the three-dimensional maps for ignition timing determination one by one from each three-dimensional map (step S4).

Next, the engine control module 11 refers to the table for sub-throttle valve opening correction, the table for fuel injection time correction, and the table for ignition timing correction from the position of the intake-side cam 78 already read in the step S2. The engine control module 11 determines a correction factor for the three-dimensional maps for sub-throttle valve opening determination (a correction factor for sub-throttle valve opening), determines a correction factor for the three-dimensional maps for fuel injection time determination (a correction factor for fuel injection time), and determines a correction factor for the three-dimensional maps for ignition timing determination (a correction factor for ignition timing) (step S5).

In the next step, the engine control module 11 corrects the two values for the duty ratio as the controlled variable of the sub-throttle valve drive motor 48, the two values for the fuel injection time of the fuel injection device 49, and the two values for the ignition timing of the ignition system 51, which are read in the step S4, with the correction factor for sub-throttle valve opening, the correction factor for fuel injection time, and the correction factor for ignition timing, respectively, to calculate the transitional portion controlled variables. The engine control module 11 then determines the duty ratio as the controlled variable of the sub-throttle valve drive motor 48, determines the fuel injection time of the fuel injection device 49, determines the ignition timing of the ignition system 51 (step S6), and thus, the controlled variable determination control is ended.

The transitional portion controlled variables are calculated from the correction factors which are set in advance for each position of the curved cam face 102 driving the intake valves 75 in the rotation axis direction of the intake-side camshaft 93, lower plane cam portion controlled variables in the plane cam shape portion 101 with a smaller valve lift characteristic on one side (i.e., lower plane cam shape portion) of the two adjacent plane cam shape portions 101, between which the transitional shape portion 103 is sandwiched, and higher plane cam portion controlled variables in the plane cam shape portion 101 with a larger valve lift characteristic on another side (i.e., higher plane cam shape portion), on the basis of a relationship shown by an expression below.

transitional portion controlled variable=lower plane cam portion controlled variable+(lower plane cam portion controlled variable−higher plane cam portion controlled variable)×correction factor  [Expression 1]

More specifically, the transitional portion controlled variables are calculated on the basis of relationships represented by the following expressions.

duty ratio for transitional portion control=lower plane cam portion duty ratio+(lower plane cam portion duty ratio−higher plane cam portion duty ratio)×correction factor for sub-throttle valve opening  [Expression 2]

fuel injection time for transitional portion control=lower plane cam portion fuel injection time+(lower plane cam portion fuel injection time−higher plane cam portion fuel injection time)×correction factor for fuel injection time  [Expression 3]

ignition timing for transitional portion control=lower plane cam portion ignition timing+(lower plane cam portion ignition timing−higher plane cam portion ignition timing)×correction factor for ignition timing  [Expression 4]

Each table for correction (i.e., correction factors) brings the transitional portion controlled variable closer to the lower plane cam portion controlled variable as the valve lift characteristic, by which the intake-side cam 78 is driven, approaches the smaller valve lift characteristic of the plane cam shape portion 101 on the one side. The transitional portion controlled variable is equal to the lower plane cam portion controlled variable at a boundary between the transitional shape portion 103 and the plane cam shape portion 101 on the one side. The table for correction (i.e., the correction factors) brings the transitional portion controlled variable closer to the higher plane cam portion controlled variable as the valve lift characteristic, by which the intake-side cam 78 is driven, approaches the larger valve lift characteristic of the plane cam shape portion 101 on the another side. The transitional portion controlled variable is equal to the higher plane cam portion controlled variable at a boundary between the transitional shape portion 103 and the plane cam shape portion 101 on the another side.

That is, the transitional portion controlled variable is calculated by using the correction table (i.e., the correction factors) that increases a weight of the three-dimensional map associated with the plane cam portion 101 having the similar valve lift characteristic.

Controlled variable determination control that takes ignition timing correction into consideration in the control device 41 will be described. A drastic change in the power of the engine 9, arising from a significant change in torque curve attendant on changing of the valve lift characteristic by switching between the plane cam shape portions 101, is moderated by taking the ignition timing correction into consideration.

Figure 6:
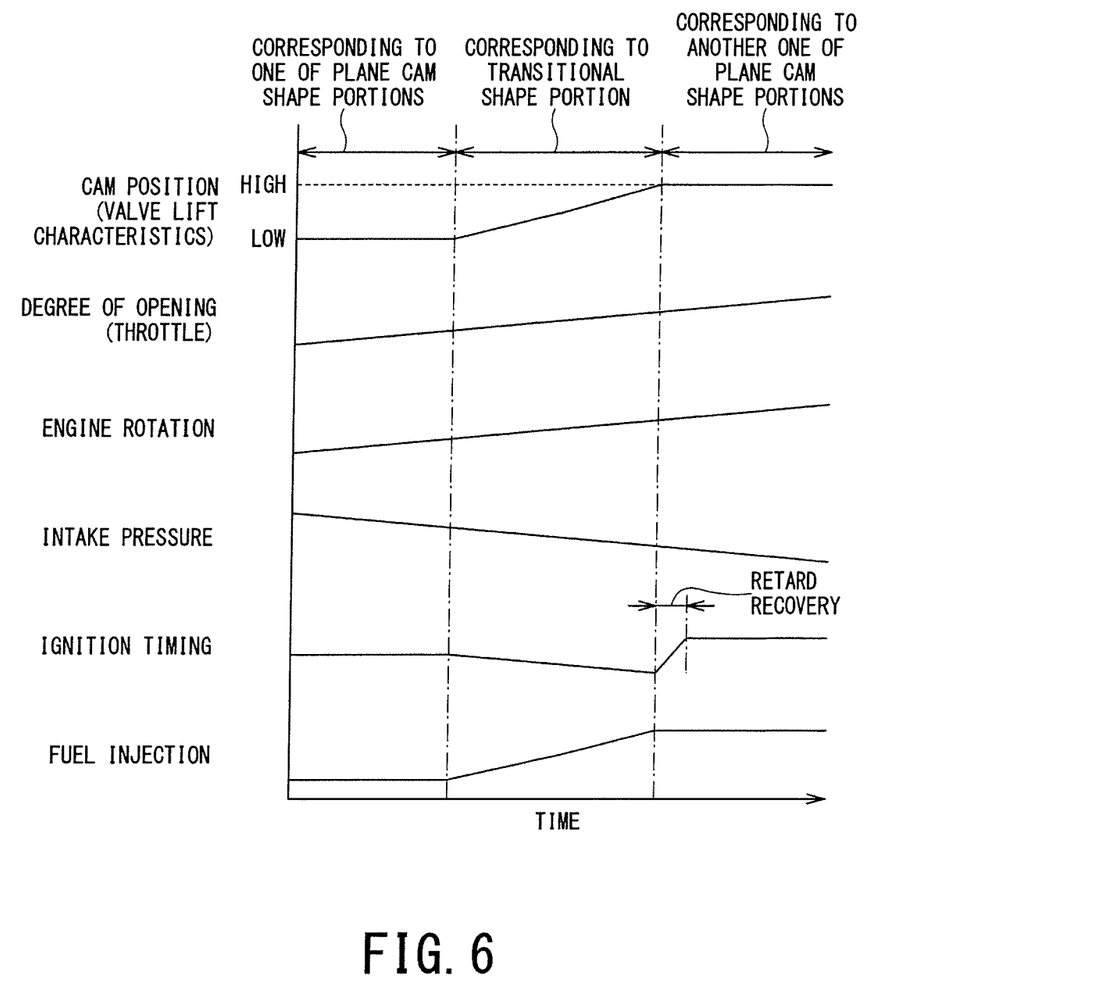
FIG. 6 is a timing chart representing the control for determining the controlled variable by applying ignition timing correction of the control device for the internal combustion engine according to the present embodiment.

FIG. 6 is a timing chart representing the controlled variable determination control by the ignition timing correction applied of the control device for the internal combustion engine according to the embodiment of the present invention.

Further, it is to be noted that in the description of FIG. 6, description common with the controlled variable determination control without effecting the ignition timing correction (i.e., the controlled variable determination control shown in FIG. 4) will be omitted herein.

As shown in FIG. 6, when changes in the opening of the throttle valve 83, the speed of the engine 9, and the manifold pressure of the engine 9 progress, the engine control module 11 of the control device 41 according to the present embodiment drives the intake valves 75 at the transitional shape portion 103 sandwiched between the two plane cam shape portions 101. At this time, the engine control module 11 refers to the respective three-dimensional maps for the ignition timing determination associated with the plane cam shape portions 101 and determines the ignition timing of the ignition system 51 by correcting reference values from the three-dimensional maps. The ignition timing correction is applied to the correction of the transitional shape portion 103.

More specifically, the engine control module 11 stores a three-dimensional map for retard amount determination for determining a retard amount for the ignition timing of the ignition system 51 from the degree of opening of the throttle valve 83 and the speed of the engine 9 and a three-dimensional map for the retard recovery determination for determining the number of the ignition operations before the ignition timing of the ignition system 51 is restored after a retard from the degree of opening of the throttle valve 83 and the speed of the engine 9.

Each table for the ignition timing correction is set in advance in consideration of the retard.

More specifically, a table for the ignition timing correction to which retard is applied (hereinafter simply referred to as a "table for ignition retard correction") first retards the ignition timing of the ignition system 51 as the valve lift characteristic, by which the intake-side cam 78 is driven, approaches a larger valve lift characteristic of the plane cam shape portion 101 on another side from a smaller valve lift characteristic of the plane cam shape portion 101 on one side. The table for ignition retard correction then recovers the retard from some midpoint as the valve lift characteristic approaches the larger valve lift characteristic of the plane cam shape portion 101 on the other side.

Further, it is to be noted that the table for the ignition retard correction does not cause the transitional portion controlled variable to reach the plane cam portion controlled variable in the plane cam shape portion 101 on the other side when the valve lift characteristic reaches a valve lift characteristic at a boundary between the transitional shape portion 103 and the plane cam shape portion 101 on the other side. A difference between the transitional portion controlled variable and the plane cam portion controlled variable is proportionally reduced to zero while ignition is performed the number of times determined by the three-dimensional map for retard recovery determination.

Figure 7:
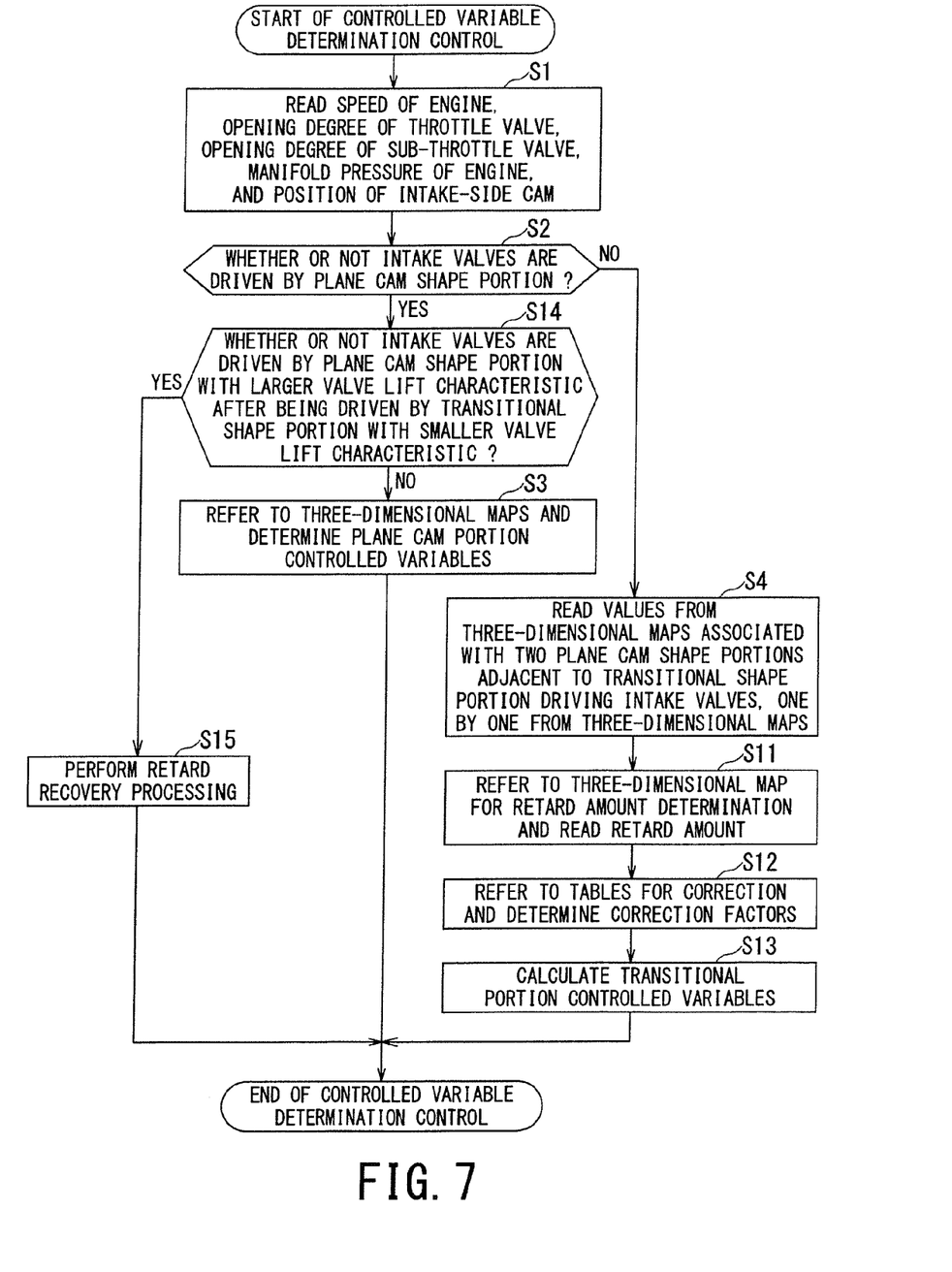
FIG. 7 is a flow chart explaining the control for determining the controlled variable of the variable valve train mechanism according to the embodiment of the present invention.

FIG. 7 is a flow chart representing the controlled variable determination control of the variable valve train mechanism according to the embodiment of the present invention.

It is further noted that processes in steps S1 to S4 of FIG. 7 are same as the processes in steps S1 to S4 of FIG. 5, and accordingly, the duplicated description will be omitted herein.

As shown in FIG. 7, after step S4, i.e., if the intake valves 75 are driven by the transitional shape portion 103, the engine control module 11 of the control device 41 according to the present embodiment refers to the three-dimensional map for retard amount determination and reads a retard amount for the ignition timing of the ignition system 51 (step S11).

The engine control module 11 refers to the table for sub-throttle valve opening correction, the table for fuel injection time correction, and the table for ignition retard correction by using the position of the intake-side cam 78 already read in the step S2. The engine control module 11 determines the correction factor for the sub-throttle valve opening, determines the correction factor for fuel injection time, and determines a correction factor for the three-dimensional maps for ignition timing determination (a correction factor for ignition retard) (step S12).

The engine control module 11 corrects two values for the duty ratio as the controlled variable of the sub-throttle valve drive motor 48, two values for the fuel injection time of the fuel injection device 49, and two values for the ignition timing of the ignition system 51, which are read in the step S4, with the correction factor for the sub-throttle valve opening, the correction factor for fuel injection time, and the correction factor for the ignition retard, respectively, to calculate the transitional portion controlled variables. The engine control module 11 determines the duty ratio as the controlled variable of the sub-throttle valve drive motor 48, determines the fuel injection time of the fuel injection device 49, determines the ignition timing of the ignition system 51 (step S13), and ends the controlled variable determination control.

A duty ratio for transitional portion control is calculated by Expression 2, and a fuel injection time for transitional portion control is calculated by Expression 3.

The ignition timing for the transitional portion control is calculated on the basis of a relationship represented by the following expression.

ignition timing for transitional portion control=lower plane cam portion ignition timing+{(lower plane cam portion ignition timing−retard amount)− higher plane cam portion ignition timing}×correction factor for ignition retard [Expression 5]

Further, it is to be noted that even when the valve lift characteristic, by which the intake valves 75 are driven, reaches the valve lift characteristic at the boundary between the transitional shape portion 103 and the plane cam shape portion 101 on the other side with the larger valve lift characteristic, the ignition timing for transitional portion control does not coincide with a value from the three-dimensional map for the ignition timing determination associated with the plane cam shape portion 101 with the larger valve lift characteristic on the other side, and a portion of a retard remains unrecovered.

Then, the engine control module 11 performs the retard recovery processing (steps S14 and S15) to eliminate the residue of the retard.

More specifically, the engine control module 11 determines, at the process interval between the step S2 and the step S3, whether or not the intake valves 75 are driven by the plane cam shape portion 101 with a larger valve lift characteristic after being driven by the transitional shape portion 103 with a smaller valve lift characteristic (i.e., whether the intake valves 75 are driven by the medium plane cam shape portion 101b after being driven by the first transitional shape portion 103a, or whether the intake valves 75 are driven by the high plane cam shape portion 101c after being driven by the second transitional shape portion 103b).

If the intake valves 75 are driven by the plane cam shape portion 101 with the larger valve lift characteristic after being driven by the transitional shape portion 103 with the smaller valve lift characteristic, the flow (process) advances to a next step, and in the other case, the flow advances to the step S3 (step S14).

The engine control module 11 performs the retard recovery processing (step S15). Immediately after the switching of the driving of the intake valves 75 from the transitional shape portion 103 with the smaller valve lift characteristic to the plane cam shape portion 101 with the larger valve lift characteristic, the ignition timing for transitional portion control is not equal to the ignition timing determined from the three-dimensional map for the ignition timing determination. For this reason, the residue of the retard (the residue of the retard=the ignition timing determined from the three-dimensional map for ignition timing determination−the ignition timing for transitional portion control) needs to be recovered.

The engine control module 11 refers to the three-dimensional map for the retard recovery determination using a sensing signal indicating the speed of the engine 9 which is output by the engine speed sensor 42 and a sensing signal indicating the degree of opening of the throttle valve 83 which is output by the throttle position sensor 45 and determines a recovery period (more specifically, the number of ignition operations before the ignition timing restoration).

The engine control module 11 divides the residue of the retard by the number of ignition operations before the ignition timing restoration and restores the ignition timing to the ignition timing determined from the three-dimensional map for ignition timing determination which is associated with the plane cam shape portion 101 driving the intake valves 75.

After the retard recovery processing, the operation (or flow) in the engine control module 11 advances to the step S3.

The control device 41 can also moderate a drastic change in the power of the engine 9 by temporarily reducing the opening of the sub-throttle valve 85 as like as the case where the retard is additionally considered for the ignition timing correction in the controlled variable determination control. In this case, the engine control module 11 stores a three-dimensional map for the opening (degree of opening) reduction amount determination for determining the opening reduction amount for the sub-throttle valve 85 from the opening of the throttle valve 83 and the speed of the engine 9 instead of the three-dimensional map for the retard amount determination and stores a three-dimensional map for the opening reduction recovery determination for determining the number of ignition operations before the opening of the sub-throttle valve 85 is restored instead of the three-dimensional map for the retard recover determination.

The control device 41 of the engine 9 according to the present embodiment controls the operation of the engine 9 by sensing (detecting) the position of the intake-side cam 78 (i.e., the plane cam shape portions 101 and the transitional shape portions 103) by the cam position sensor 43 and switching the plane cam portion controlled variables or the transitional portion controlled variables on the basis of the sensing result from the cam position sensor 43 to respond to a change in the valve lift characteristic for the intake valves 75.

Therefore, the control device 41 can control the operation of the engine 9 with controlled variables suitable for the valve lift characteristic for the intake valves 75, i.e., the transitional portion controlled variables during the switching between the plane cam shape portions 101, i.e., while the intake valves 75 are driven by the transitional shape portion 103.

The transitional portion controlled variables suitable for the valve lift characteristic for the intake valves 75 prevent a phenomenon, from causing, in which an air fuel ratio of an air-fuel mixture becomes leaner than a theoretical air fuel ratio to lead to a misfire or the like while the intake valves 75 are driven by the transitional shape portion 103. The control device 41 can maintain the theoretical air fuel ratio with the transitional portion controlled variables with accuracy higher than a case with so-called acceleration correction that is correction increasing a fuel injection amount.

The control device 41 of the engine 9 according to the present embodiment can control the operation of the engine 9 with controlled variables suitable for the valve lift characteristic changing with each passing moment for the intake valves 75, i.e., the transitional portion controlled variables by correcting the transitional portion controlled variables with a position of the curved cam face 102 which is driving the intake valves 75. The transitional portion controlled variables suitable for the valve lift characteristic changing with each passing moment for the intake valves 75 more reliably prevents the phenomenon, from causing, in which the air fuel ratio of the air-fuel mixture becomes leaner than the theoretical air fuel ratio to lead to a misfire or the like while the intake valves 75 are driven by the transitional shape portion 103.

In addition, the control device 41 of the engine 9 according to the present embodiment makes the plane cam portion controlled variables and the transitional portion controlled variables smoothly continuous with each other by correcting the transitional portion controlled variables as indicated by Expression 1, Expression 2, Expression 3, Expression 4, and Expression 5 and switches smoothly between the plane cam portion controlled variables and the transitional portion controlled variables, thus allowing the minimization of change in the power of the engine 9 at a switching point between the plane cam portion controlled variables and the transitional portion controlled variables.

Moreover, the control device 41 of the engine 9 according to the present embodiment can correct the fuel injection amount, the ignition timing, and the sub-throttle valve opening separately or in combination, and can thus adjust the control of the operation of the engine 9 more finely.

Furthermore, the control device 41 of the engine 9 according to the present embodiment can easily apply retard of ignition timing and easily respond to a significant change in accordance with torque curve attendant on changing of the valve lift characteristic by the switching between the plane cam shape portions 101.

Thus, the control device 41 of the engine 9 according to the present invention can smoothly and continuously change the power of the engine 9 at the time of switching the valve lift characteristic for the intake valves 75.

It is further to be noted that the present invention is not limited to the described embodiments and many other changes and modifications or alternations may be made without departing the spirits or scopes of the appended claims.

What is claimed is:

1. A control device for an internal combustion engine, comprising:
   a camshaft of the internal combustion engine;
   a plurality of plane cam shape portions, which are provided to the camshaft, respectively have valve lift characteristics different from each other, respectively have cam faces parallel to a rotation axis of the camshaft, and are spaced apart from each other;
   at least one transitional shape portion, which is provided between adjacent plane cam shape portions so as to be integral with the two plane cam shape portions and has a curved cam face connecting the cam faces of the adjacent plane cam shape portions so as to be continuous with the cam faces;
   a cam switching mechanism, which is configured to switch a cam between the valve lift characteristics for an intake valve by selecting one of the plurality of plane cam shape portions via the transitional shape portion;
   a cam position sensor, which is configured to sense which position of the cam faces and the curved cam face in a rotation axis direction of the camshaft drives the intake valve; and
   a control unit, which is configured to make a plane cam portion controlled variable for the internal combustion engine in a case where the cam face drives the intake valve and a transitional portion controlled variable for the internal combustion engine in a case where the curved cam face drives the intake valve different from each other on the basis of a sensing result from the cam position sensor.

2. The control device for the internal combustion engine according to claim 1, wherein the control unit is adopted to correct the transitional portion controlled variable with a position of the curved cam face in the rotation axis direction of the camshaft.

3. The control device for the internal combustion engine according to claim 1, wherein the transitional portion controlled variable is calculated from a correction factor which is set in advance for each of positions at the curved cam face driving the intake valve in the rotation axis direction of the camshaft, and a higher plane cam portion controlled variable in a higher plane cam shape portion larger in the valve lift characteristic of the adjacent plane cam shape portions, between which the transitional shape portion is sandwiched, and a lower plane cam portion controlled variable in a lower plane cam shape portion smaller in the valve lift characteristic on the basis of a relationship shown by an expression:

the transitional portion controlled variable=the lower plane cam portion controlled variable+(the lower plane cam portion controlled variable−the higher plane cam portion controlled variable)×the correction factor.

4. The control device for the internal combustion engine according to claim 1, wherein each of the plane cam portion controlled variable and the transitional portion controlled variable corresponds to a fuel injection amount.

5. The control device for the internal combustion engine according to claim 1, wherein each of the plane cam portion controlled variable and the transitional portion controlled variable corresponds to an ignition timing.

6. The control device for the internal combustion engine according to claim 5, wherein the ignition timing is retarded in relation to a relationship between a speed of the internal combustion engine and a throttle valve opening.

7. The control device for the internal combustion engine according to claim 1, wherein each of the plane cam portion controlled variable and the transitional portion controlled variable corresponds to a sub-throttle valve opening.

8. The control device for the internal combustion engine according to claim 7, wherein the ignition timing is retarded in relation to a relationship between a speed of the internal combustion engine and a throttle valve opening.

* * * * *